United States Patent [19]
Zeller et al.

[11] Patent Number: 4,735,573
[45] Date of Patent: Apr. 5, 1988

[54] ALIGNING DEVICE FOR A CURRENT CONNECTOR OF PROTECTIVE GAS BAG IMPACT INSTALLATIONS

[75] Inventors: Gregor Zeller, Aschaffenburg; Helmut Bonn, Haibach, both of Fed. Rep. of Germany

[73] Assignee: Petri A.G., Fed. Rep. of Germany

[21] Appl. No.: 842,947

[22] Filed: Mar. 24, 1986

[30] Foreign Application Priority Data

Mar. 23, 1985 [EP] European Pat. Off. ........ 85103483.5

[51] Int. Cl.$^4$ .............................................. H01R 35/00
[52] U.S. Cl. .................................... 439/15; 29/281.5; 403/12
[58] Field of Search ............... 339/3 R, 3 S; 29/281.5; 285/23; 403/12, 365; 439/15, 16

[56] References Cited

U.S. PATENT DOCUMENTS

| | | | |
|---|---|---|---|
| 3,395,934 | 8/1968 | Rosan et al. | 285/23 |
| 3,525,536 | 8/1970 | Pruneski | 339/3 S |
| 3,763,455 | 10/1973 | Cowfer et al. | 339/3 S |
| 4,422,699 | 12/1983 | Sakurai et al. | 339/3 S |
| 4,451,105 | 5/1984 | Sakurai | 339/3 R |
| 4,607,898 | 8/1986 | Reighard et al. | 339/3 S |

FOREIGN PATENT DOCUMENTS 3009109  2/1986  Fed. Rep. of Germany .

*Primary Examiner*—John McQuade
*Attorney, Agent, or Firm*—Robert J. Koch

[57] ABSTRACT

Aligning device for a current carrying connector of protective gas bag impact installations having a helical conductor arranged with several concentric windings within a fixedly mounted housing surrounding a core. The core is fastened to a steering spindle and rotates with the steering wheel. A first end of the helical strip terminates in terminals associated with the housing. The second end terminals are associated with the core. The core is equipped with a bore and the housing with a locking recess. The housing and the core may be immobilized in relation to each other using locking means having a clip pin insertable into the bore of the core and a locking projection fitting into the locking recess. The locking means may exhibit a ring surrounding the steering spindle and resting on the core or a pot surrounding a steering spindle. The locking recess and locking projection have respective widths which allow a slight rotational clearance between the core and the housing.

10 Claims, 1 Drawing Sheet

ALIGNING DEVICE FOR A CURRENT CONNECTOR OF PROTECTIVE GAS BAG IMPACT INSTALLATIONS

This application is related to EP No. 85 102304.4 corresponding to U.S. application Ser. No. 835,282, now U.S. Pat. No. 4,657,326, EP No. 85 103482.7 corresponding to U.S. application Ser. No. 842,948, EP No. 85 103484.3 corresponding to U.S. application Ser. No. 842,949, and EP No. 85 103485.0 corresponding to U.S. application Ser. No. 842,833, now U.S. Pat. No. 4,660,500. The disclosures of all of the above documents are expressly incorporated by reference herein.

BACKGROUND OF THE INVENTION

1. Field of the Invention

The invention relates to an aligning device for a current carrying connector of protective gas bag impact installations. The current conductor is a conducting strip or ribbon cable laid out in several concentric windings within a housing and surrounding the steering spindle or the hub of a steering wheel. One end of said strip terminates in a core fastened to the steering wheel hub. The other end terminates in the fixedly mounted housing.

2. Description of the Related Art

The current carrying connectors shown in DE-OS No. 30 09 109.9 perform well in actual operation. However, difficulties are occasionally encountered due to incorrect installation of the current carrying connector because the helically arranged strip has a longitudinal length for maximum wheel deflection of approximately six windings. The electric lead must be installed in the center position of the helical strip with the wheels of the vehicle in the straight line travelling position. If there is an unintended rotation or malalignment of the housing in relation to the core prior to the assembly, the maximum rotating angle of the steering wheel may be unilaterally shortened or limited. This potentially may result in an accident due to limited steering range or breakage of the connector and incapacitation of the protective gas bag impact installation. It is necessary to carefully inspect the position of the helical strip and relative positions of the fixed housing and hub manually prior to and during the mounting of the steering column and to accurately align the components in the center position. Even with substantial expenditures of labor for inspection, incorrect settings by the installer cannot be completely prevented, nor can proper installation procedures be ensured.

SUMMARY OF THE INVENTION

It is an object of the present invention to provide a steering wheel with a current connector of the above-described type, where the risk or improper installation during the initial installation or possible subsequent installations following dismantling for maintenance is reduced. According to the invention, the core is equipped with a bore. The housing exhibits a locking recess. The housing and the core can be immobilized in relation to each other by a locking means having a clip pin for insertion into the bore of the core and a locking projection which fits into the locking recess.

According to the invention, the housing and associated connectors are moved to their correct position or alignment with the core, and immobilized or locked in this position thereby preventing practically all incorrect installations so that no unintentional rotation is allowed. The lock is only released following installation.

In an exemplary embodiment the locking means may be a ring surrounding the passage bore for the steering spindle. The locking means may alternatively be a pot or cup surrounding the passage bore for the steering spindle. In either case, the respective edge of the ring or cup rests on the core thereby significantly facilitating gripping of the locking means for the purpose of pulling it off after the assembly or for its insertion prior to any dismantling that may become necessary. The locking recess has, with respect to the locking projection, a greater width than the locking projection thereby allowing a slight rotational clearance to equalize the rotating path tolerances resulting from tooth divisions of the spindle.

DETAILED DESCRIPTION OF THE PREFERRED EMBODIMENTS

Figure 1:
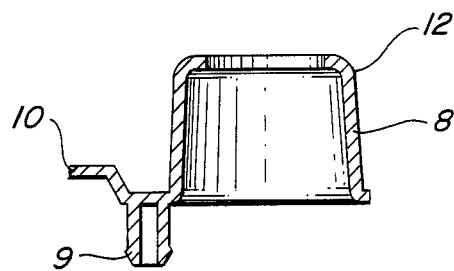
FIG. 1 shows an alignment device according to the invention.
Figure 2:
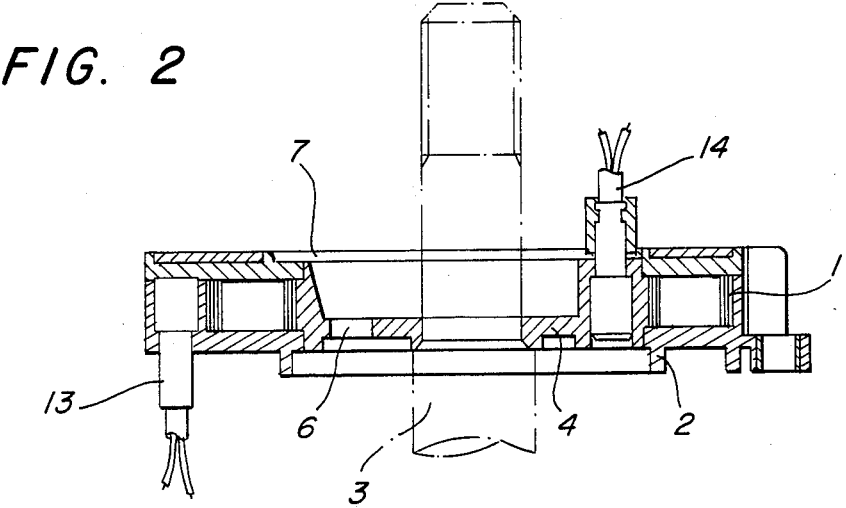
FIG. 2 shows a steering assembly.
Figure 3:
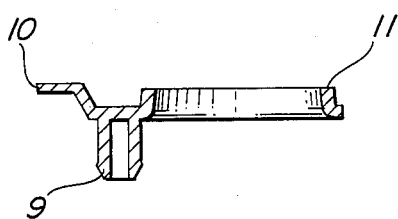
FIG. 3 shows an alternative alignment device.

The aligning device shown in the drawing is for steering wheels equipped with a current connector for protective gas bag impact installations having a current conductor. The conductor cable may be a helical strip 1, arranged in several concentric windings in a fixedly mounted housing 2, surrounding a core 4. The core 4 is fastened to the steering spindle 3 and rotates with the steering wheel. A first terminal end 13 of the helical strip 1 is associated with the housing 2 while the second terminal end 14 is associated with core 4. The core 4 is equipped with a bore 6 and the housing 2 with a locking recess 7. Locking means 8 has a clip pin 9 insertable in the bore 6 of the core 4 and a locking projection 10 fitting into the locking recess for immobilizing the core 4 and housing 2, respectively. The locking means 8 in the embodiment shown exhibits a pot or cup 12 encompassing or surrounding the passage bore for the steering spindle 3, its edge rests on the core 4. The pot or cup may be replaced with a ring 11 surrounding the passage bore for the steering spindle 3 and resting on the core 4. The locking recess 7 has a width assuring a slight rotational clearance, not shown in the drawing, with respect to the locking projection 10 between the core 4 and the housing 2, in order to equalize the rotational path tolerance resulting from a tooth division of the steering spindle.

We claim:

1. An aligning device for a current carrying connector of protective gas bag impact installations, comprising a helical strip current conductor arranged in a plurality of concentric windings within a fixedly mounted housing, and a core fastened to a steering spindle and rotating with a steering wheel, ends of the helical strip terminating in terminals on the housing and on the core wherein the core exhibits a bore and the housing exhibits a locking recess; means for immobilizing the housing and the core in relation to each other comprising means for locking exhibiting a clip pin insertable into the bore of the core and a locking projection fitting into the locking recess.

2. An aligning device for a current connector according to claim 1, wherein said locking means further comprises a ring surrounding a core passage bore for the steering spindle and rests on the core.

3. An aligning device for a current connector according to claim 1, wherein said locking means further comprises a pot surrounding a core passage bore for the steering spindle and rests on the core.

4. An aligning device for a current connector according to claim 2, wherein said locking recess exhibits a width assuring a slight clearance relative to the locking projection.

5. An aligning device for a current connector according to claim 3, wherein said locking recess exhibits a width assuring a slight clearance relative to the locking projection.

6. A steering wheel conductor installation aligning device for a steering apparatus having a fixed housing and a rotating core arranged within said housing comprising a locking member exhibiting:

means for interlocking with said rotating core; and means for fixing relative motion of said rotation core and said fixed housing to a preset alignment connected to said means for interlocking;

wherein said means for interlocking exhibits a clip pin configured for removable insertion into a bore and said means for fixing is a locking projection configured for insertion in a locking recess.

7. A device according to claim 6, wherein said locking member further comprises ring means for fitting around a spindle bore in said core.

8. A device according to claim 7, wherein said locking projection is configured with a predetermined degree of play relative to said locking recess.

9. A device according to claim 6, wherein said locking member further comprises pot means for fitting over a spindle bore in said core.

10. A device according to claim 9, wherein said locking projection is configured with a predetermined degree of play relative to said locking recess.

* * * * *